United States Patent [19]

Imakawa et al.

[11] Patent Number: 5,325,160
[45] Date of Patent: Jun. 28, 1994

[54] HALF TONE RECORDING METHOD AND LIGHT SOURCE DEVICE FOR WRITING

[75] Inventors: Susumu Imakawa; Hidetoshi Ema, both of Yokohama, Japan

[73] Assignee: Ricoh Company, Ltd., Tokyo, Japan

[21] Appl. No.: 935,561

[22] Filed: Aug. 26, 1992

[30] Foreign Application Priority Data

| Aug. 28, 1991 | [JP] | Japan | 3-217403 |
| Aug. 28, 1991 | [JP] | Japan | 3-217404 |
| Apr. 30, 1992 | [JP] | Japan | 4-110976 |

[51] Int. Cl.$^5$ ............... G03G 15/048; G03G 15/32
[52] U.S. Cl. ............... 355/239; 346/108; 358/298
[58] Field of Search ........ 355/266, 246, 239, 208; 346/160, 108; 358/298, 296, 300, 302

[56] References Cited

U.S. PATENT DOCUMENTS

| 4,544,264 | 10/1985 | Bassetti et al. | 355/208 X |
| 5,144,337 | 9/1992 | Imamura et al. | 346/108 |
| 5,144,338 | 9/1992 | Sakano | 346/108 |
| 5,162,820 | 11/1992 | Yamamoto et al. | 346/160 X |

*Primary Examiner*—A. T. Grimley
*Assistant Examiner*—Shuk Y. Lee
*Attorney, Agent, or Firm*—Oblon, Spivak, McClelland, Maier & Neustadt

[57] ABSTRACT

A half tone recording method has the steps of representing one picture element of image information including inputted density information by a matrix composed of K×L small pixels where K designates the number of small pixels in a main scanning direction and L designates the number of small pixels in a sub-scanning direction and numbers K and L are integers equal to or greater than one and are not simultaneously set to one; freely selecting a light emitting pulse width of a light source within the one pixel in a divisional pulse unit obtained by dividing a pulse width T with respect to one micro pixel; freely selecting the light intensity of the light source about the divisional pulse at plural values of m kinds; increasing the light intensity about the divisional pulse in a certain micro pixel from a minimum intensity value to a maximum intensity value; and increasing the light intensity from the minimum intensity value about a divisional pulse in the micro pixel adjacent in the sub-scanning direction to the divisional pulse providing the maximum light intensity. A light source device for writing is used in execution of the half tone recording method.

3 Claims, 8 Drawing Sheets

HALF TONE RECORDING METHOD AND LIGHT SOURCE DEVICE FOR WRITING

BACKGROUND OF THE INVENTION

1. Field of the Invention

The present invention relates to a half tone recording method applied to an optical image recorder such as a laser printer, a digital copying machine, a laser facsimile, etc., and a light source device for writing used in this half tone recording method.

2. Description of the Related Art

Recently, plain paper can be used and a high quality image can be obtained at a high speed in a laser printer constructed by combining an electrophotographic technique and a laser scanning technique with each other. Therefore, such a laser printer has been rapidly spread as an output device of a computer, a digital copying machine, etc.

In such a situation, to obtain a higher quality image, it is effective to use a recording system for making resolution and gradient consistent with each other by a one-dot multivalued recording system.

The multivalued recording system used in the laser printer is generally divided into a light intensity modulating system and a pulse width modulating system. In the pulse width modulating system, the recording operation of an image can be comparatively stably performed irrespective of external changing factors since a binary recording operation is approximately performed.

Figure 1:
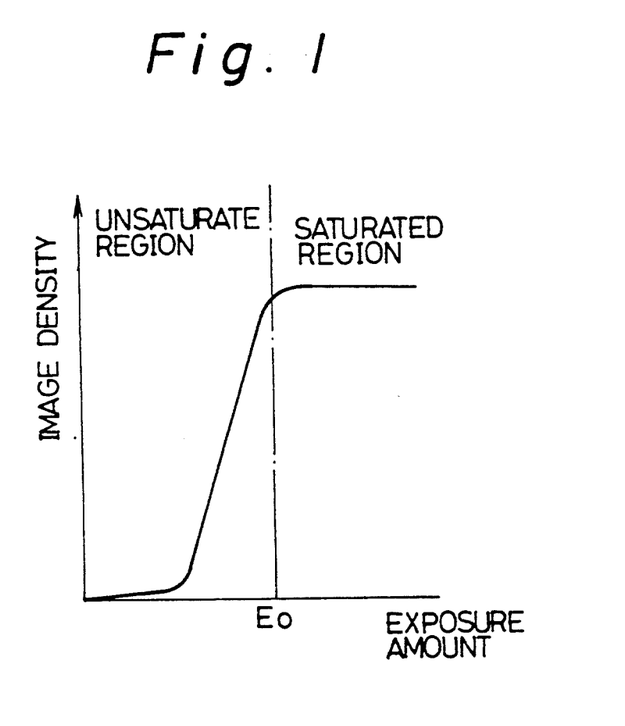
FIG. 1 is a characteristic graph showing the relation between an exposure amount and an image density in an electrophotographic device.

FIG. 1 shows the relation between an exposure amount and an image density in electrophotographic recording. An electrophotographic device has unsaturated and saturated regions with respect to the image density. In the unsaturated region, the image density is increased in accordance with the exposure amount until an exposure amount $E_0$. In the saturated region, the image density is saturated in a range in which the exposure amount is equal to or greater than the exposure amount $E_0$. An intermediate exposure region of a photosensitive body as the unsaturated region is used in a system for modulating the light intensity of a semiconductor laser so that a high accuracy in exposure energy control is required. A control technique for obtaining such a high accuracy can be realized by forming a high speed photoelectric negative feedback loop. Namely, 256 gradations are easily realized by a pixel clock signal having 20 MHz using this control technique.

However, in the pulse width modulating system, a time pitch for changing pulse widths is significantly decreased as a laser scanning speed is increased (as the frequency of a writing pixel clock signal is increased). For example, in the case of the pixel clock signal having 20 MHz, a time pitch of about 0.2 nanoseconds is required when the number of gradations represented by one dot is set to 256. Accordingly, the pulse width modulating system has serious problems concerning accuracy and cost.

Figure 2A:
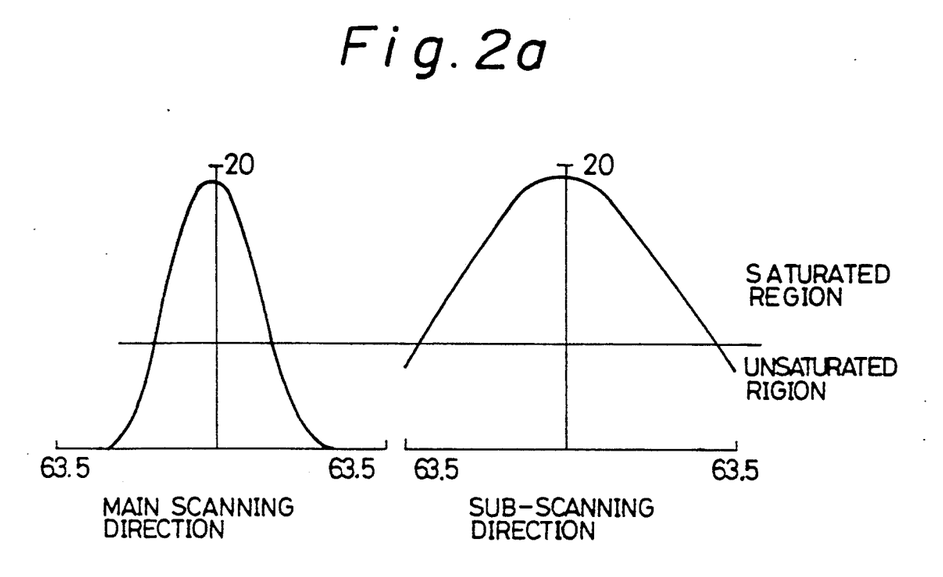
FIGS. 2a and 2b are respectively characteristic graphs showing exposure energy distributions in a pulse width modulating system and a light intensity modulating system.
Figure 2B:
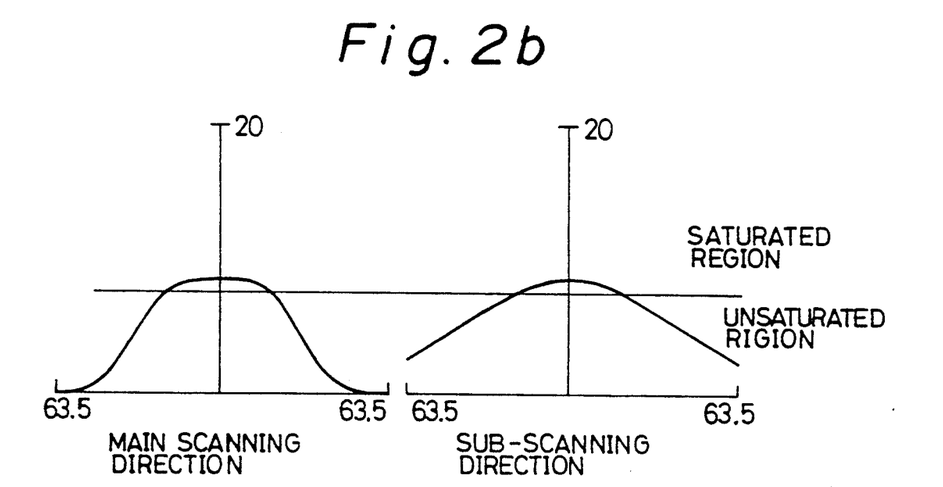

When an image is formed by an electrophotographic process using the light intensity modulating system, the rotational speed of a recording medium as the photosensitive body is changed and the image density is also changed by the inclination of a polygonal face. Further, no surface potential of the photosensitive body has a steep distribution in a low density section. Therefore, the reproducibility of dots is reduced. Each of FIGS. 2a and 2b shows an exposure energy distribution when an image is recorded by pulse width modulation and light intensity modulation at the same image density. FIGS. 2a and 2b respectively show cases of the pulse width modulation and the light intensity modulation in which 400 dpi is set and an exposure beam diameter is set to 40 $\mu$m in a main scanning direction and 80 $\mu$m in a sub-scanning direction. In the pulse width modulating system, the saturated region has a large area and gradation about area is approximately obtained. In contrast to this, the unsaturated region has a large area in the light intensity modulating system. This is because the image density tends to be changed by a change in overlapping degree of exposure energy between adjacent scanning lines caused by a change in scanning line pitch.

A half tone recording system provided by combining the light intensity modulating system with the pulse width modulating system is proposed to improve the above disadvantages of these modulating systems. In this half tone recording system, a light emitting pulse width of a light source can be freely selected in a divisional pulse unit ($\Delta T_1$, $\Delta T_2$, - - -) obtained by dividing a pulse width T with respect to one pixel. Further, light intensity of the light source can be freely selected at plural values such as light intensity values of m kinds ($P_1$, $P_2$, - - -, $P_m$ in a low order of the light intensity) with respect to such divisional pulses. After the light intensity about a certain divisional pulse is increased from the minimum light intensity $P_1$ to the maximum light intensity $P_m$, the light intensity about a divisional pulse adjacent to this certain divisional pulse in the main scanning direction is increased from the minimum light intensity $P_1$ to the maximum light intensity $P_m$. Such processing is repeatedly performed sequentially. Thus, an image is recorded by selecting the light emitting pulse width and the light intensity in accordance with an increase in density level of image information.

However, in such a combinatorial half tone recording system, a toner particle diameter is large in comparison with one dot in the present electrophotographic process and a toner image is disturbed at a transfer time. Therefore, an image having a very low quality is obtained when a one-dot multivalued recording operation is performed.

SUMMARY OF THE INVENTION

It is therefore a first object of the present invention to provide a half tone recording method for obtaining a stable half tone image having an improved reproducibility.

A second object of the present invention is to provide a light source device for writing in which control accuracy in exposure energy can be improved and a half tone image having a high quality can be recorded at a high speed.

The above first object of the present invention can be achieved by a first half tone recording method comprising the steps of representing one picture element of image information including inputted density information by a matrix composed of $K \times L$ small pixels where K designates the number of small pixels in a main scanning direction and L designates the number of small pixels in a sub-scanning direction and numbers K and L are integers equal to or greater than one and are not simultaneously set to one; freely selecting a light emitting pulse width of a light source within the one pixel in a divisional pulse unit obtained by dividing a pulse width T with respect to one micro pixel; freely selecting the light intensity of the light source about the divisional pulse at plural values of m kinds; increasing the light intensity about the divisional pulse in a certain micro pixel from a minimum intensity value to a maximum intensity value; and increasing the light intensity from the minimum intensity value with respect to a divisional pulse in the micro pixel adjacent in the sub-scanning direction to the divisional pulse providing the maximum light intensity.

In accordance with the first half tone recording method of the present invention, one pixel is represented by a matrix composed of plural small pixels. In the selections of a light emitting pulse width and a light intensity according to an increase in density level in the image information, the light emitting pulse width and the light intensity are sequentially set such that the light intensity is sequentially increased until the maximum light intensity with respect to a divisional pulse adjacent in the sub-scanning direction to a divisional pulse exposed at the maximum light intensity between the small pixels. Accordingly, a half tone image is represented with a line extending in the sub-scanning direction as a basic tone so that reproducibility of the half tone image is improved and the half tone image is stabilized.

In the above first half tone recording method, the divisional pulse in the certain micro pixel is preferably composed of a divisional pulse near a center of the matrix with respect to the main scanning direction.

Further, in the above first half tone recording method, the half tone recording method preferably comprises a step in which, after the light intensity is increased until the maximum intensity value with respect to the divisional pulse in the adjacent micro pixel in the sub-scanning direction, the light intensity is increased from the minimum intensity value to the maximum intensity value with respect to a divisional pulse adjacent to this divisional pulse in the adjacent micro pixel in the main scanning direction.

In accordance with the above preferable features, no image quality is reduced so much by an irregular image density caused by a change in rotational speed of a photosensitive body and a change in laser scanning position. Further, a potential well formed in the photosensitive body is steep so that reproducibility of dots is improved.

The above second object of the present invention can be achieved by a light source device for writing used in the execution of a half tone recording method, the light source device comprising a semiconductor laser; a light receiving element for receiving and detecting an optical output of this semiconductor laser; a photoelectric negative feedback loop for controlling a forward electric current of the semiconductor laser such that a light receiving signal proportional to the detected optical output is equal to a light-emitting level command signal; converting means for converting the light-emitting level command signal to the forward electric current of the semiconductor laser on the basis of optical output-forward current characteristics of the semiconductor laser, a coupling coefficient of optical outputs of the light receiving element and the semiconductor laser, and optical input-light receiving signal characteristics of the light receiving element such that the light receiving signal is equal to the light-emitting level command signal; and control means for controlling an operation of the semiconductor laser by an electric current provided by performing an adding or subtracting operation of a control electric current of the photoelectric negative feedback loop and an electric current generated by the converting means.

In accordance with the light source device for writing in the present invention, the operation of the semiconductor laser as the light source is controlled by a semiconductor laser control circuit as the control means operated at a high speed with high accuracy and resolution. Accordingly, an accuracy in control of exposure energy is increased so that it is possible to record a half tone image having a high quality at a high speed.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a half tone recording method and a light source device for writing in the present invention will next be described in detail with reference to the accompanying drawings.

Figure 3:
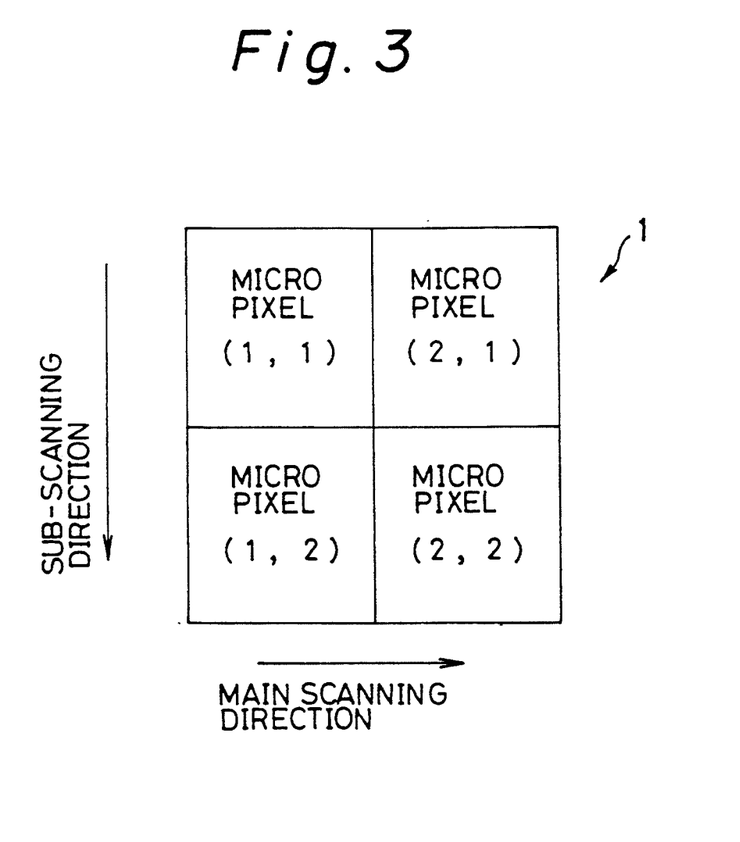
FIG. 3 is a typical view showing a matrix construction of one pixel.

A half tone recording method in the first embodiment of the present invention will next be described with reference to FIGS. 3 to 8. This embodiment corresponds to a first embodiment of the invention. One pixel of image information including inputted density information is represented by a matrix 1 composed of K small pixels (K is an integer satisfying $K \geq 1$) in a main scanning direction and L small pixels (L is an integer satisfying $L \geq 1$) in a sub-scanning direction. In this case, no integers K and L are simultaneously set to one. A half tone is represented by selecting such small pixels as described later. FIG. 3 shows the case of $K=L=2$ and an example of the matrix 1 composed of four small pixels which can be shown by coordinates (1,1), (1,2), (2,1) and (2,2). Further, a light emitting pulse width of a light source can be freely selected in a divisional pulse unit obtained by dividing a modulating pulse width T corresponding to each of the small pixels. Light intensity can be freely selected at plural values of m kinds by using divisional pulses as a unit. A half tone recording operation providing multiple gradations is performed by combining pulse width modulation with light intensity modulation. In this embodiment, good measurements are taken in the selections of these small pixels, the light emitting pulse width and the light intensity. FIGS. 4a to 4d typically show waveforms of optical outputs in the micro pixel unit when a modulating pulse having a width T is divided into four divisional pulses $\Delta T_1$, $\Delta T_2$, $\Delta T_3$ and $\Delta T_4$ and four kinds of light intensity values (m=4) $P_1$, $P_2$, $P_3$ and $P_4$ in a small order are set in the light intensity modulation. Accordingly, in this embodiment, for example, the half tone recording operation is performed at 65 multiple values (65=(4×4)×4+1) shown by multivalued levels 0 to 64 with respect to one pixel.

Namely, the small pixels within the matrix 1, the divisional pulses and the light intensity are selected in accordance with density information (the multivalued levels) included in the image information. No exposure is performed at the multivalued level 0 so that this level 0 is a texture level.

At the multivalued levels 1 to 4, for example, a half tone is represented by sequentially changing the light intensity values in a small order of $P_1$, $P_2$, $P_3$ and $P_4$ with respect to the divisional pulse $\Delta T_1$ of the micro pixel (1,1). Light intensity level states are shown by reference numerals 1, 2, 3 and 4 in FIG. 4a. At the subsequent multivalued levels 5 to 8, the half tone is represented by sequentially changing the light intensity values in the small order of $P_1$, $P_2$, $P_3$ and $P_4$ with respect to the divisional pulse $\Delta T_1$ of the micro pixel (1,2) adjacent in the sub-scanning direction to the micro pixel (1,1) selected until the multivalued level 4. For example, in the case of the multivalued level 7, exposure at the maximum light intensity $P_4$ with respect to the divisional pulse $\Delta T_1$ of the micro pixel (1,1) is combined with exposure at the third light intensity $P_3$ with respect to the divisional pulse $\Delta T_1$ of the micro pixel (1,2) so that the half tone is represented by this combination.

At the multivalued levels 9 to 16, for example, the half tone is represented by sequentially changing the light intensity values $P_1$, $P_2$, $P_3$ and $P_4$ in an order of the small pixels (1,1) and (1,2) with respect to the divisional pulse $\Delta T_2$ adjacent in the main scanning direction to the divisional pulse $\Delta T_1$ selected at the maximum light intensity $P_4$ until the multivalued level 8. Optical output level states of the micro pixel (1,1) or (1,2) are shown by reference numerals 5, 6, 7 and 8 in FIG. 4b. For example, in the case of the multivalued level 10, the maximum light intensity $P_4$ is set with respect to the divisional pulse $\Delta T_1$ of each of the small pixels (1,1) and (1,2), and is combined with the light intensity $P_2$ with respect to the divisional pulse $\Delta T_2$ of the micro pixel (1,1). Similarly, for example, in case of the multivalued level 15, the maximum light intensity $P_4$ is set with respect to the divisional pulse $\Delta T_1$ of each of the small pixels (1,1) and (1,2) and is also set with respect to the divisional pulse $\Delta T_2$ of the micro pixel (1,1). This maximum light intensity $P_4$ is combined with the light intensity $P_3$ with respect to the divisional pulse $\Delta T_2$ of the micro pixel (1,2).

At the multivalued levels 17 to 32, the half tone is represented by sequentially changing the divisional pulses in the order of $\Delta T_3$ and $\Delta T_4$, the small pixels in the order of (1,1) and (1,2) and the light intensity values in the order of $P_1$, $P_2$, $P_3$ and $P_4$. Changes in light intensity with respect to the divisional pulse $\Delta T_3$ are shown by reference numerals 9, 10, 11 and 12 in FIG. 4c. Changes in light intensity with respect to the divisional pulse $\Delta T_4$ are shown by reference numerals 13, 14, 15 and 16 in FIG. 4d. Accordingly, at the multivalued level 32, all regions of the small pixels (1,1) and (1,2) are exposed at the maximum light intensity $P_4$.

Figure 4A:
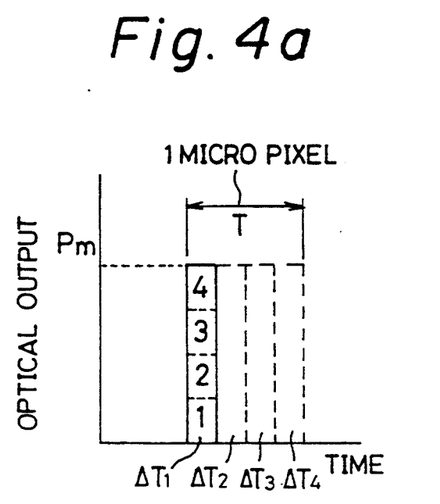
FIGS. 4a, 4b, 4c, and 4d are views sequentially showing divisional pulses and optical output control in a micro pixel unit in a first embodiment of the present invention.
Figure 4B:
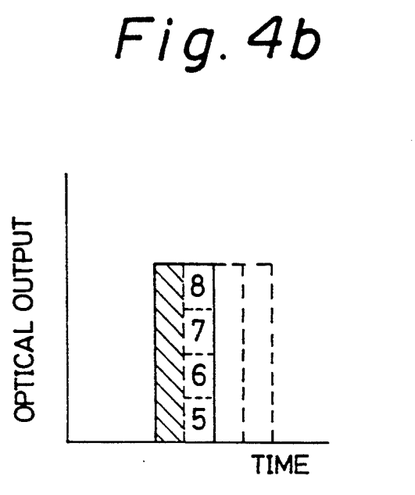
Figure 4C:
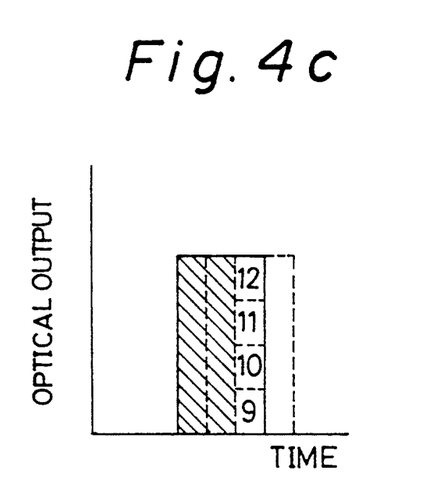
Figure 4D:
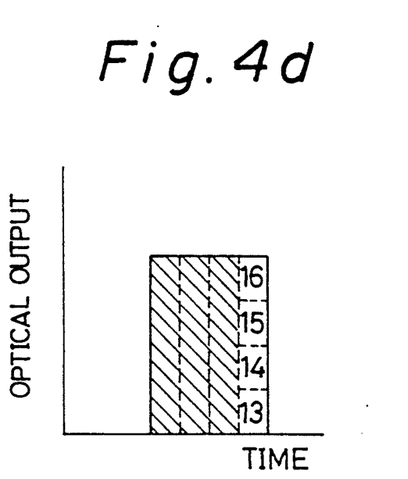

At the multivalued levels 33 to 64, the divisional pulses and the light intensity values are selected in similar sequential orders so that the half tone is represented by exposing the small pixels (2,1) and (2,2).

Thus, the multivalued half tone is represented by 65 values.

In accordance with the half tone recording system in this embodiment, it is possible to obtain an exposure energy distribution approximately similar to that in the case of the pulse width modulating system shown in FIG. 2a. Accordingly, the area of an unsaturated region is small in the exposure energy distribution in a photosensitive body. Further, since the exposure energy distribution is steep, an electric potential distribution of the photosensitive body is also steep so that reproducibility of dots is improved.

No divisional pulses are necessarily selected from the left-hand side to the right-hand side in the main scanning direction. For example, the divisional pulses may be selected in the order of $\Delta T_2$, $\Delta T_3$, $\Delta T_1$ and $\Delta T_4$ or the order of $\Delta T_3$, $\Delta T_2$, $\Delta T_4$ and $\Delta T_1$. Namely, when the maximum light intensity is provided in all of a certain series of divisional pulses adjacent to each other in the sub-scanning direction, it is sufficient to select the divisional pulses such that a divisional pulse adjacent to this divisional pulse series in the main scanning direction is set to be an object of the light intensity modulation.

In the real image recording operation, no relation between such multivalued levels (exposure energy) and an output image density is a linear relation. Accordingly, there is a case in which all the multivalued levels are not used but are selectively used in the image recording operation, and the relation between a density signal included in inputted image information and the density of an outputted image is corrected (which is generally called $\gamma$ correction). This invention can be similarly applied to this case.

To simplify explanations, FIGS. 3 and 4 show an example in which the number of small pixels is set to K×L=2×2, the number of divisional pulses 4, and the number of kinds of light intensity is set to m=4 to provide 65 multivalued levels. However, the number of small pixels, the number of divisional pulses and the number of kinds of light intensity are not limited to these numbers.

Figure 5:
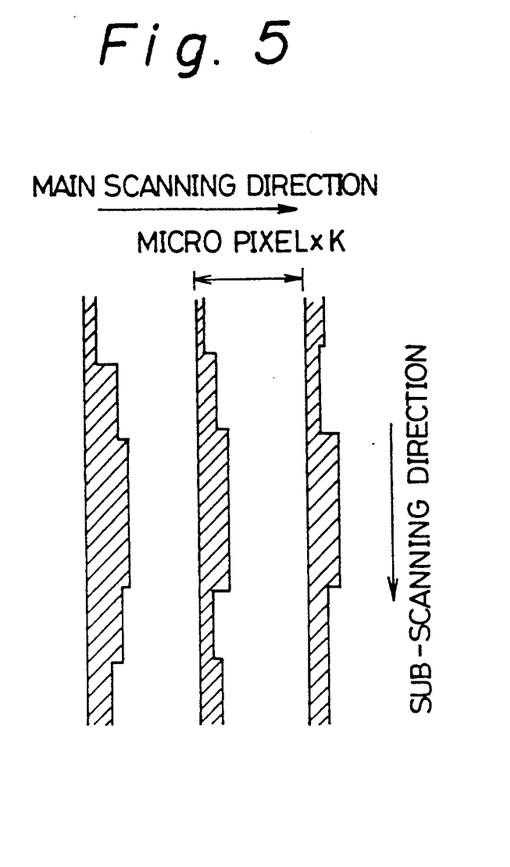
FIG. 5 is an explanatory view showing an enlarged image output as an example in this first embodiment.
Figure 6:
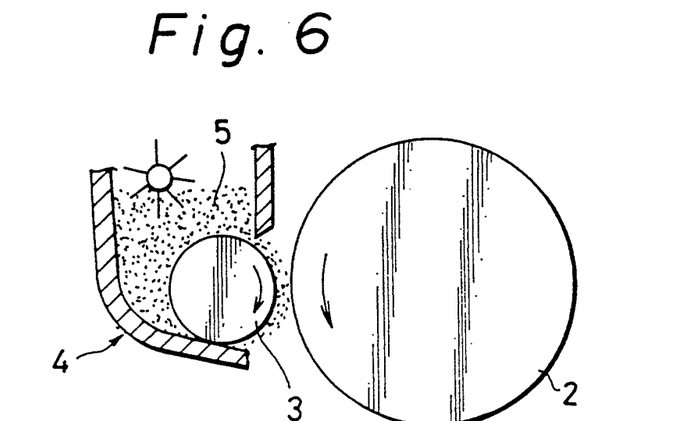
FIG. 6 is a schematic front view showing a portion of an electrophotographic device.
Figure 7:
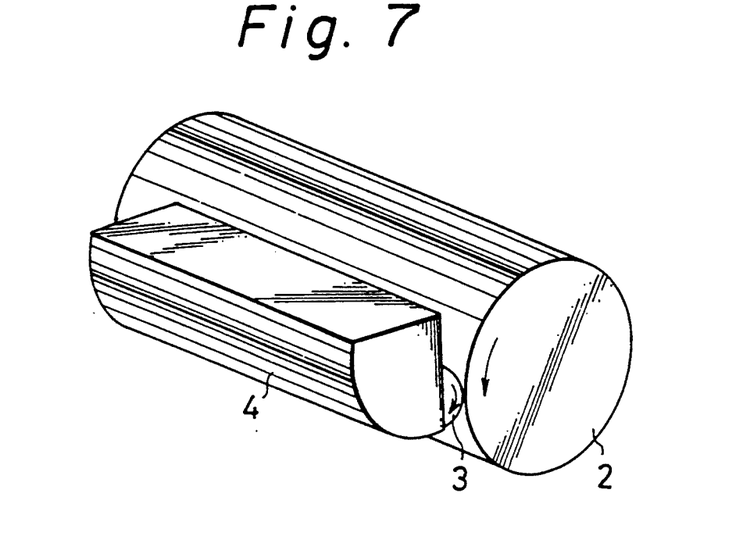
FIG. 7 is a schematic perspective view of the portion of the electrophotographic device shown in FIG. 6.

FIG. 5 shows an example of an outputted image in which a half tone image is recorded by the half tone recording method in this embodiment. The outputted image is represented by longitudinal lines having pitches represented by micro pixel size×K and extending in the sub-scanning direction. As shown in FIGS. 6 and 7, in an electrophotographic process, a developing operation using toner 5 is performed by a developing device 4 having a developing roller 3 coming in contact with or in proximity to a photosensitive body 2 rotated in the sub-scanning direction. A longitudinal line having a long contact or proximate time with respect to the developing roller 3 is a line on which the image is recorded in the sub-scanning direction. A transversal line is a line on which the image is recorded in the main scanning direction. Reproducibility on the longitudinal line is better than that on the transversal line so that a stable half tone image is obtained.

For example, a writing operation of such a half tone image is performed by a light source device for writing in which a light source is constructed by a semiconductor laser. The construction and operation of a control circuit for controlling an operation of the semiconductor laser will next be described in detail with reference to FIG. 8. A comparing amplifier 6 and a current converter 7 as a current converting means receive command signals at light emitting levels. A light receiving element 9 monitors a portion of an optical output of a semiconductor laser 8. The comparing amplifier 6, the semiconductor laser 7 and the light receiving element 8 form a photoelectric negative feedback loop 10. The comparing amplifier 6 compares a light receiving signal proportional to a photovoltaic current induced in the light receiving element 8 with a light-emitting level command signal. The photovoltaic current is proportional to the optical output of the semiconductor laser 8. The comparing amplifier 6 controls a forward current of the semiconductor laser 8 by the comparing results such that the light receiving signal is equal to the light-emitting level command signal. The current converter 7 outputs an electric current preset in accordance with the light-emitting level command signal such that the above light receiving signal is equal to the light-emitting level command signal. The preset electric current is an electric current set in advance on the basis of optical output-forward current characteristics of the semiconductor laser 8, a coupling coefficient of optical outputs of the light receiving element 9 and the semiconductor laser 8, and optical input-forward current characteristics of the light receiving element 9. An electric current provided by adding an output current of the current converter 7 to a control current outputted from the comparing amplifier 6 is controlled as a forward current of the semiconductor laser 8.

Figure 8:
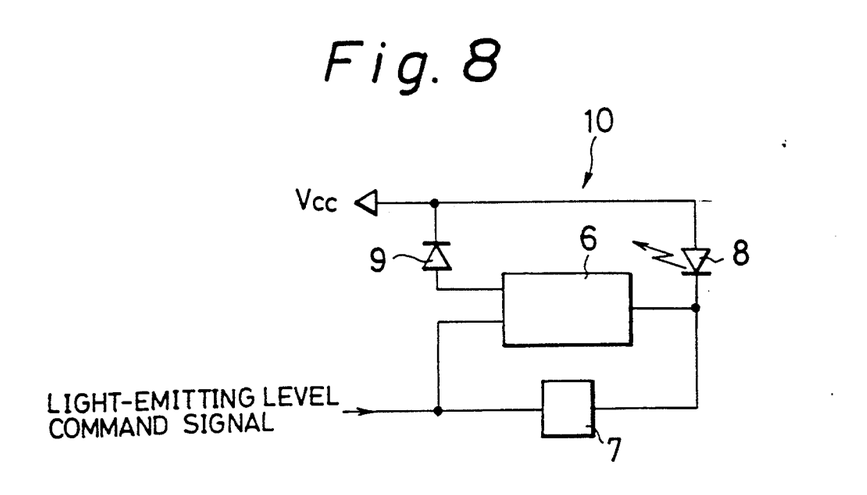
FIG. 8 is a circuit diagram showing the construction of a semiconductor laser control circuit.

In the following description, $f_0$ designates a cross frequency in an open loop of the photoelectric negative feedback loop 10, and a DC gain is set to 10000. An optical output at time $t = \infty$ is set to PL and a light quantity set by the current converter 7 is set to PS. In this case, the step response characteristics of an optical output Pout of the semiconductor laser 8 can be approximately represented as follows.

$$Pout = PL + (PS - PL) \exp(-2\pi f_0 t)$$

Since the DC gain in the open loop of the photoelectric negative feedback loop 10 is set to 10000, the optical output PL is equal to a set light quantity when an allowable range of a set error is set to be equal to or smaller than 0.1%. Accordingly, if the light quantity PS set by the current converter 7 is equal to PL, the optical output of the semiconductor laser 8 is instantly equal to PL. An error in optical output of the semiconductor laser 8 with respect to a set value thereof is equal to or smaller than 0.4% after 10 nanoseconds if frequency $f_0$ is equal to about 40 MHz even when the light quantity PS is changed by 5% by disturbances, etc.

An exposure light amount can be accurately controlled by using the semiconductor laser control circuit having high resolution and accuracy and operated at a high speed even when the width of a divisional pulse is reduced. Accordingly, no operation of the semiconductor laser control circuit is easily influenced by a change in rotational speed of the photosensitive body 2 and a change in laser scanning position. Further, reproducibility of dots is improved. Furthermore, it is possible to construct a laser printer having a high accuracy in exposure energy control so that a high quality image can be obtained.

Figure 9:
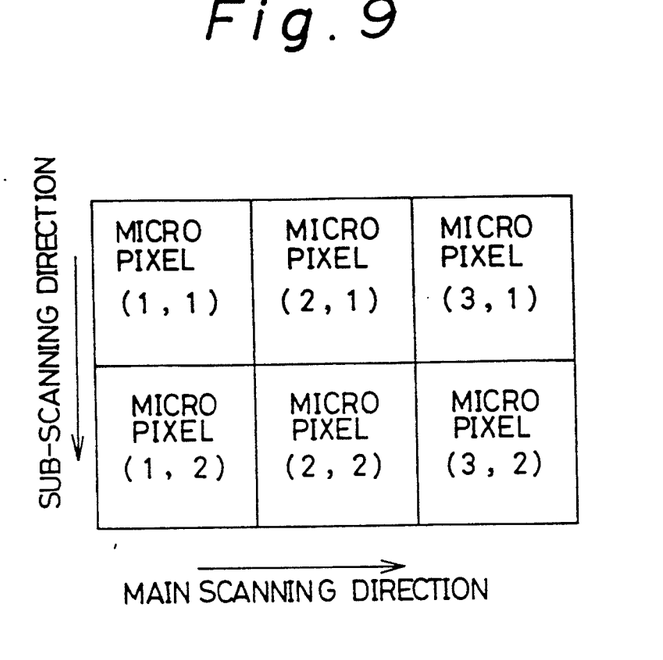
FIG. 9 is a typical view showing a matrix construction of one pixel in a second embodiment of the present invention.
Figure 10A:
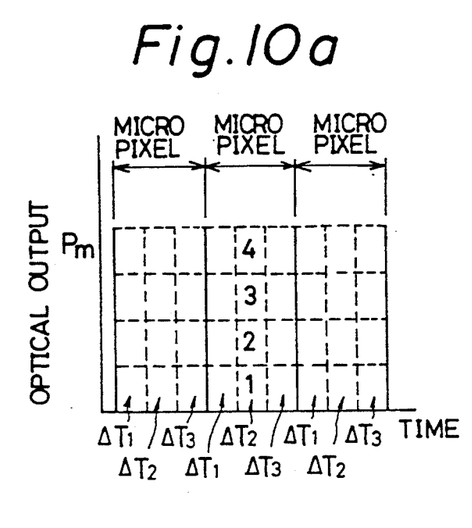
FIGS. 10a, 10b, 10c, 10d, and 10e are typical views sequentially showing divisional pulses and optical output control in a micro pixel unit in the second embodiment.
Figure 10B:
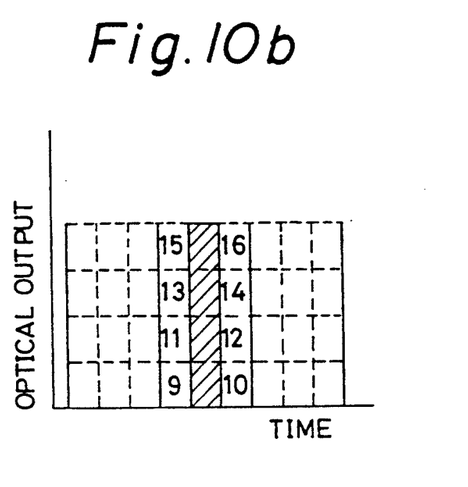
Figure 10C:
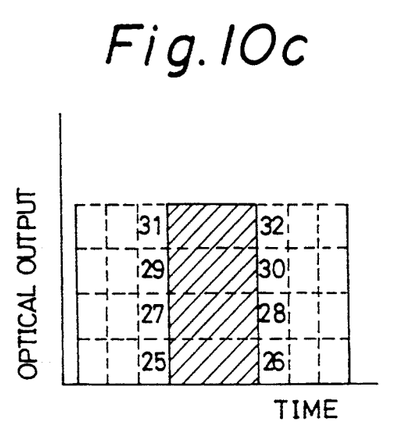
Figure 10D:
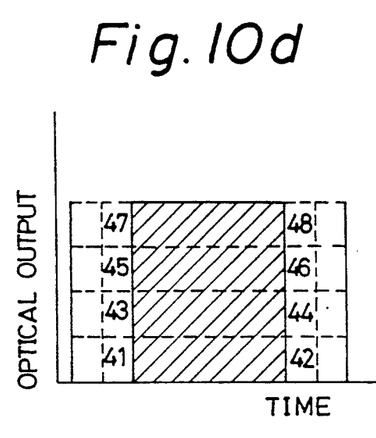
Figure 10E:
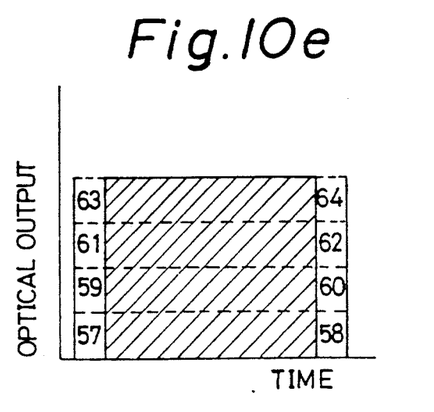
Figure 11:
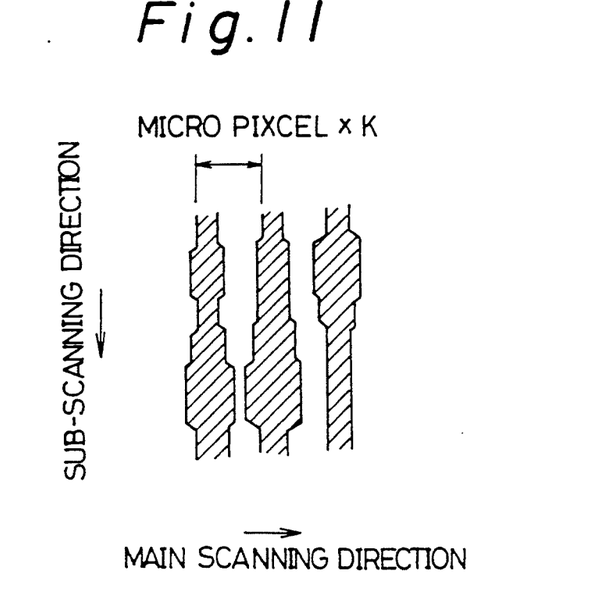
FIG. 11 is an explanatory view showing an enlarged image output as an example in this second embodiment.

A second embodiment of the present invention will next be described with reference to FIGS. 9 to 11. In FIGS. 9 to 11, the same constructional portions as those in the first embodiment are designated by the same reference numerals. This second embodiment corresponds to a second half tone recording method of the present invention. Similar to the first embodiment, one pixel of image information including inputted density information is represented by a matrix 1 composed of K small pixels (K is an integer satisfying $K \geq 1$) in a main scanning direction and L small pixels (L is an integer satisfying $L \geq 1$) in a sub-scanning direction. A half tone is represented by selecting such small pixels as described later. FIG. 9 shows the case of $K = 2$ and $L = 3$ and an example of the matrix 1 composed of six small pixels which can be shown by coordinates (1, 1), (1, 2), (2, 1), (2, 2), (3, 1) and (3, 2). Further, in this embodiment, a light emitting pulse width of a light source can be freely selected in a divisional pulse unit obtained by dividing a modulating pulse width T corresponding to each of the small pixels. Light intensity can be freely selected at plural values of m kinds by using divisional pulses as a unit. A half tone recording operation providing multiple gradations is performed by combining pulse width modulation with light intensity modulation. In this embodiment, good measurements are taken in the selections of these small pixels, the light emitting pulse width and the light intensity. FIGS. 10a to 10e typically show waveforms of optical outputs in the micro pixel unit when a modulating pulse having a width T is divided into three divisional pulses $\Delta T_1$, $\Delta T_2$ and $\Delta T_3$ and four kinds of light intensity values ($m = 4$) $P_1$, $P_2$, $P_3$ and $P_4$ in a small order are set in the light intensity modulation. Accordingly, in this embodiment, for example, the half tone recording operation is performed at 73 multiple values ($73 = 4 \times 9 \times 2 + 1$) shown by multivalued levels 0 to 72 with respect to one pixel.

Namely, the small pixels within the matrix 1, the divisional pulses and the light intensity are selected in accordance with density information (the multivalued levels) included in the image information. No exposure is performed at the multivalued level 0 so that this level 0 is a texture level.

At the multivalued levels 1 to 4, for example, a half tone is represented by sequentially changing the light intensity values in a small order of $P_1$, $P_2$, $P_3$ and $P_4$ with respect to the divisional pulse $\Delta T_2$ of the approximately central micro pixel (2, 1). The divisional pulse $\Delta T_2$ is a central divisional pulse in the main scanning direction in the matrix 1. Light intensity level states are shown by reference numerals 1, 2, 3 and 4 in FIG. 10a. At the subsequent multivalued levels 5 to 8, the half tone is represented by sequentially changing the light intensity values in the small order of $P_1$, $P_2$, $P_3$ and $P_4$ with respect to the divisional pulse $\Delta T_2$ of the micro pixel (2, 2) adjacent in the sub-scanning direction to the micro pixel (2, 1) selected until the multivalued level 4. Light intensity level states are also shown by reference numerals 1, 2, 3 and 4 in FIG. 10a. For example, in the case of the multivalued level 7, exposure at the maximum light intensity $P_4$ with respect to the divisional pulse $\Delta T_2$ of the micro pixel (2, 1) is combined with exposure at the third light intensity $P_3$ with respect to the divisional pulse $\Delta T_2$ of the micro pixel (2, 2) so that the half tone is represented by this combination.

At the multivalued levels 9 to 16, the half tone is represented by sequentially changing the light intensity values $P_1$, $P_2$, $P_3$ and $P_4$ alternately with respect to the divisional pulses $\Delta T_1$ and $\Delta T_3$ adjacent on both sides in the main scanning direction to the divisional pulse $\Delta T_2$ in the micro pixel (2, 1) selected at the maximum light intensity $P_4$ until the multivalued level 8. At this time, optical output level states about the micro pixel (2, 1) are shown by reference numerals 9 to 16 in FIG. 10b. At the multivalued levels 17 to 24, the half tone is realized by performing processings similar to those about the multivalued levels 9 to 16 with respect to the divisional pulses $\Delta T_1$ and $\Delta T_3$ on both sides of the divisional pulse $\Delta T_2$ of the micro pixel (2, 2) in the main scanning direction. Accordingly, at this time, optical output level states about the micro pixel (2, 2) are similar to those shown in FIG. 10b. For example, in the case of the multivalued level 13, exposures are combined with each other with respect to the micro pixel (2, 1) at the light intensity $P_3$ about the divisional pulse $\Delta T_1$, the maximum light intensity $P_4$ about the divisional pulse $\Delta T_2$ and the light intensity $P_2$ about the divisional pulse $\Delta T_3$. Further, in the case of the multivalued level 13, the exposures are combined with each other with respect to the micro pixel (2, 2) at the maximum light intensity $P_4$ about the divisional pulse $\Delta T_2$. Similarly, in the case of the multivalued level 19, exposures are combined with each other at the maximum light intensity $P_4$ with respect to all divisional pulses $\Delta T_1$, $\Delta T_2$ and $\Delta T_3$ of the micro pixel (2, 1). Further, in the case of the multivalued level 19, the exposures are combined with each other with respect to the micro pixel (2, 2) at the light intensity $P_2$ about the divisional pulse $\Delta T_1$, the maximum light intensity $P_4$ about the divisional pulse $\Delta T_2$ and the light intensity $P_1$ about the divisional pulse $\Delta T_3$.

At the multivalued levels 25 to 32, the half tone is represented by changing the light intensity values in the order of $P_1$, $P_2$, $P_3$ and $P_4$ alternately with respect to the divisional pulse $\Delta T_3$ in the micro pixel (1, 1) and the divisional pulse $\Delta T_1$ in the micro pixel (3, 1). These divisional pulses $\Delta T_3$ and $\Delta T_1$ are adjacent to each other on both sides of a divisional pulse providing the maximum light intensity in the main scanning direction. Alternative changes in light intensity about these divisional pulses $\Delta T_3$ and $\Delta T_1$ are shown by reference numerals 25 to 32 in FIG. 10c. Similar to the multivalued levels 25 to 32, at the multivalued levels 33 to 40, the half tone is represented by changing the light intensity values in the order of $P_1$, $P_2$, $P_3$ and $P_4$ alternately with respect to the divisional pulse $\Delta T_3$ in the micro pixel (1, 2) and the divisional pulse $\Delta T_1$ in the micro pixel (3, 2). These divisional pulses $\Delta T_3$ and $\Delta T_1$ are adjacent to each other on both sides of a divisional pulse providing the maximum light intensity in the main scanning direction.

At the multivalued levels 41 to 48, the half tone is represented by changing the light intensity values in the order of $P_1$, $P_2$, $P_3$ and $P_4$ alternately with respect to the divisional pulse $\Delta T_2$ in each of the small pixels (1, 1) and (3, 1). These divisional pulses are adjacent to each other on both sides of a divisional pulse providing the maximum light intensity in the main scanning direction until the multivalued level 40. Alternative changes in light intensity about this divisional pulse $\Delta T_2$ are shown by reference numerals 41 to 48 in FIG. 10d. Similar to the multivalued levels 41 to 48, at the multivalued levels 49 to 56, the half tone is represented by changing the light intensity values in the order of $P_1$, $P_2$, $P_3$ and $P_4$ alternately with respect to the divisional pulse $\Delta T_2$ in each of the small pixels (1, 2) and (3, 2).

At the multivalued levels 57 to 64, the half tone is represented by changing the light intensity values in the order of $P_1$, $P_2$, $P_3$ and $P_4$ alternately with respect to the divisional pulse $\Delta T_1$ in the micro pixel (1, 1) and the divisional pulse $\Delta T_3$ in the micro pixel (3, 1). These divisional pulses are adjacent to each other on both sides of a divisional pulse providing the maximum light intensity in the main scanning direction until the multivalued level 56. Alternative changes in light intensity about these divisional pulses $\Delta T_1$ and $\Delta T_3$ are shown by reference numerals 57 to 64 in FIG. 10e. Similar to the multivalued levels 57 to 64, at the multivalued levels 65 to 72, the half tone is represented by changing the light intensity values in the order of $P_1$, $P_2$, $P_3$ and $P_4$ alternately with respect to the divisional pulse $\Delta T_1$ in the micro pixel (1, 2) and the divisional pulse $\Delta T_3$ in the micro pixel (3, 2).

Thus, the multivalued half tone is represented by 73 values.

In the half tone recording system in this embodiment, it is possible to obtain an exposure energy distribution approximately similar to that in the case of the pulse width modulating system shown in FIG. 2a. Accordingly, it should be understood that the area of an unsaturated region is small in the exposure energy distribution in a photosensitive body. Further, since the exposure energy distribution is steep, an electric potential distribution of the photosensitive body is also steep so that reproducibility of dots is improved.

In the real image recording operation, no relation between such multivalued levels (exposure energy) and an output image density is a linear relation. Accordingly, there is a case in which all the multivalued levels are not used but are selectively used in the image recording operation, and the relation between a density signal included in inputted image information and the density of an outputted image is corrected (which is generally called $\gamma$ correction). This invention can be similarly applied to this case.

To simplify explanations in the second embodiment, FIG. 9 shows an example in which the number of small pixels is set to $K \times L = 2 \times 3$, the number of divisional pulses 3, and the number of kinds of light intensity is set to $m = 4$ to provide 73 multivalued levels. However, the number of small pixels, the number of divisional pulses and the number of kinds of light intensity are not limited to these numbers.

FIG. 11 shows an example of an outputted image in which a half tone image is recorded by the half tone recording method in this embodiment. The outputted image is represented by longitudinal lines having pitches represented by micro pixel size $\times K$ and extending in the sub-scanning direction. As shown in FIGS. 6 and 7, in an electrophotographic device, a developing operation using toner 5 is performed by the developing device 4 having the developing roller 3 coming in contact with or in proximity to the photosensitive body 2 rotated in the sub-scanning direction. Reproducibility on a longitudinal line having a long contact time with respect to the developing roller 3 is better than that on a transversal line so that a stable half tone image is obtained. Further, no center of a pixel is moved so much since the center of a pattern in the main scanning direction is preferentially processed.

For example, a writing operation of such a half tone image is performed by a light source device for writing in which a light source is constructed by a semiconductor laser. In this embodiment, this writing operation may be performed by using a semiconductor laser control circuit constructed as shown in FIG. 8.

Many widely different embodiments of the present invention may be constructed without departing from the spirit and scope of the present invention. It should be understood that the present invention is not limited to the specific embodiments described in the specification, except as defined in the appended claims.

What is claimed is:

1. A half tone recording method comprising the steps of:
   (a) representing one picture element of image information including inputted density information by a matrix composed of K×L small pixels where K designates a number of small pixels in a main scanning direction and L designates a number of small pixels in a sub-scanning direction and where K and L are integers equal to or greater than one and are not both equal to one;
   (b) selecting a light emitting pulse width of a light source in response to density information at a divisional pulse unit obtained by dividing a pulse width T corresponding to one small pixel;
   (c) selecting an intensity of the light source from m different values in response to the density information with respect to the divisional pulse; and
   (d) recording the image information by a combination of said selected light emitting pulse width and said selected light intensity,
   said method being adjusted to select a corresponding divisional pulse in a small pixel adjacent in the sub-scanning direction with respect to a certain small pixel and to increase the light intensity from a minimum intensity value in response to the density information with respect to said selected corresponding divisional pulse in the small pixel adjacent in the sub-scanning direction with respect to the certain small pixel, when the light intensity is increased to a maximum intensity value with respect to a divisional pulse in the certain small pixel.

2. A half tone recording method as claimed in claim 1, wherein the divisional pulse in the certain small pixel comprises a divisional pulse near a center of said matrix with respect to the main scanning direction.

3. A half tone recording method as claimed in claim 1, or 2, which is adjusted to select a divisional pulse adjacent in the main scanning direction with respect to the divisional pulse in the certain small pixel and to increase the light intensity from the minimum intensity value in response to the density information with respect to this selected divisional pulse, in a case where the light intensity is increased to the maximum intensity value with respect to corresponding divisional pulses in L small pixels located in the sub-scanning direction with respect to the certain small pixel.

* * * * *